(12) United States Patent
Tessnow et al.

(10) Patent No.: US 9,103,520 B1
(45) Date of Patent: Aug. 11, 2015

(54) COMBINATION TURN AND TAIL MULTI-COLOR LED LAMP

(71) Applicants: Thomas Tessnow, Weare, NH (US); Mike Tucker, Henniker, NH (US); Adam Bushre, Saranac, MI (US); Ronald E. Boyd, Jr., Chichester, NH (US)

(72) Inventors: Thomas Tessnow, Weare, NH (US); Mike Tucker, Henniker, NH (US); Adam Bushre, Saranac, MI (US); Ronald E. Boyd, Jr., Chichester, NH (US)

(73) Assignee: OSRAM SYLVANIA Inc., Danvers, MA (US)

( * ) Notice: Subject to any disclaimer, the term of this patent is extended or adjusted under 35 U.S.C. 154(b) by 0 days.

(21) Appl. No.: 14/256,278

(22) Filed: Apr. 18, 2014

(51) Int. Cl.
    *F21V 8/00* (2006.01)
    *F21S 8/10* (2006.01)
    *F21V 29/503* (2015.01)

(52) U.S. Cl.
    CPC ........... *F21S 48/2231* (2013.01); *F21S 48/215* (2013.01); *F21S 48/23* (2013.01); *F21S 48/32* (2013.01); *F21V 29/503* (2015.01)

(58) Field of Classification Search
    CPC ......... F21S 48/23; F21S 48/32; F21S 48/215; F21S 48/503; F21V 29/503
    See application file for complete search history.

(56) References Cited

U.S. PATENT DOCUMENTS

| | | |
|---|---|---|
| 6,357,902 B1 | 3/2002 | Horowitz |
| 6,796,698 B2 | 9/2004 | Sommers et al. |
| 6,871,988 B2 | 3/2005 | Gebauer et al. |
| 6,991,355 B1 | 1/2006 | Coushaine et al. |
| 7,110,656 B2 | 9/2006 | Coushaine et al. |
| 7,111,972 B2 | 9/2006 | Coushaine et al. |
| 7,275,839 B2 | 10/2007 | Coushaine et al. |
| 7,341,365 B2 | 3/2008 | Basile et al. |
| 7,753,540 B2 | 7/2010 | Swantner et al. |
| 7,762,700 B2 | 7/2010 | Luo et al. |
| 7,995,882 B2 | 8/2011 | Wanninger et al. |
| 8,104,939 B2 | 1/2012 | Coushaine et al. |
| 8,292,463 B2* | 10/2012 | Speier et al. .................. 362/294 |
| 8,354,781 B2 | 1/2013 | Tessnow |
| 8,398,283 B2 | 3/2013 | Lambert et al. |
| 8,764,257 B2* | 7/2014 | De Lamberterie ............ 362/511 |
| 9,010,982 B2* | 4/2015 | Kropac et al. ................ 362/615 |
| 2001/0015899 A1 | 8/2001 | Kondo et al. |
| 2002/0136027 A1 | 9/2002 | Hansler et al. |
| 2007/0070645 A1 | 3/2007 | Coushaine et al. |
| 2009/0034283 A1 | 2/2009 | Albright et al. |
| 2010/0142194 A1 | 6/2010 | Masuda |
| 2010/0208488 A1 | 8/2010 | Luo |
| 2012/0250343 A1 | 10/2012 | Koizumi |
| 2013/0044503 A1 | 2/2013 | Mihara et al. |
| 2013/0051005 A1 | 2/2013 | Markell et al. |
| 2013/0201708 A1* | 8/2013 | Takahashi ..................... 362/510 |

FOREIGN PATENT DOCUMENTS

| | | |
|---|---|---|
| EP | 2159477 A2 | 3/2010 |
| WO | 2010079436 A1 | 7/2010 |

* cited by examiner

*Primary Examiner* — Thomas M Sember
(74) *Attorney, Agent, or Firm* — Edward S. Podszus

(57) ABSTRACT

An automotive combined turn signal and tail/stop lamp (10) having co-axial transparent collimating inner and outer light guides (18, 30). Inner collimating light guide (18) receives light from a yellow LED (16), outer collimating light guide (30) receives light from red LEDs (14), the yellow and red LEDs located in thermal communication with a common heat sink (2). Mirror optics (40, 42) reflect light from respective light output prisms (28, 35) of the inner and outer light guides outward to nested reflectors on the automobile. Electrical conductors (48) between the light guides (18, 30) can feed power from a PC board (12) to supply additional light sources within an RCL housing, such as white back-up light.

18 Claims, 5 Drawing Sheets

COMBINATION TURN AND TAIL MULTI-COLOR LED LAMP

CROSS REFERENCE TO RELATED APPLICATIONS

N/A

TECHNICAL FIELD

The present disclosure relates generally to a light emitting diode (LED) automotive lamp with an integrated turn function and a stop function.

BACKGROUND AND ACKNOWLEDGED PRIOR ART

The following lamps are known: U.S. Pat. No. 8,354,781 (Tessnow); U.S. Pat. No. 7,110,656 (Coushaine); U.S. Pat. No. 7,995,882 (Wanninger); U.S. Pat. No. 8,104,939 (Coushaine); U.S. Pat. No. 7,753,540 (Swantner); U.S. Pat. No. 6,796,698 (Sommers); U.S. Pat. No. 6,991,355 (Coushaine); U.S. Pat. No. 6,871,988 (Gebauer); U.S. Pat. No. 7,341,365 (Basile); U.S. Pat. No. 7,762,700 (Luo); U.S. Pat. No. 8,398,283 (Lambert); U.S. Pat. No. 7,111,972 (Coushaine); U.S. Pat. No. 7,275,839 (Coushaine); and U.S. Pat. No. 6,357,902 (Horowitz); U.S. published Appln. US 2013/0051005 (Markell); 2013/0044503 (Mihara); 2009/0034283 (Albright); 2007/0070645 (Coushaine); 2002/0136027 (Hansler); 2010/0208488 (Luo); 2010/0142194 (Masuda); 2001/0015899 (Kondo); 2012/0250343 (Koizumi); and International Appln. WO 2010/079436 (Boonekamp) and EP 2 159 477 (Hirano).

It is also known in an automotive combination LED tail and signal lamp, believed to be commercially available in the United States, to have a yellow LED positioned within a turn function reflector cavity and the heat sink for the yellow LED attached to the backside of the turn signal reflector; and in such lamp, the red stop LED light is positioned in the focal point of a stop reflector cavity behind the turn signal reflector. A transparent connecting member extending between the red LED/heat sink component and yellow LED/heat sink component positions the yellow LED and its heat sink in front of the red LED, allowing emitted red light to pass through the connecting member. The heat sink of the stop function is located on the rear of the stop reflector. In such arrangement the heat sinks are all located within the Rear Combination Lamp (RCL) housing. The applicants herein were the ones to recognize that in such lamp a heat sink size is limited by the RCL housing, that the heat sink for the yellow turn lamp could cause shadow problems with the red tail lamp, that air flow was not promoted to the outside for cooling the LEDs, and that electrical connection to the yellow turn LED intrudes into the emitted red stop light to cast a shadow.

BRIEF DESCRIPTION OF THE DRAWINGS

Reference should be made to the following detailed description, read in conjunction with the following figures, wherein like numerals represent like parts.

Figure 1:
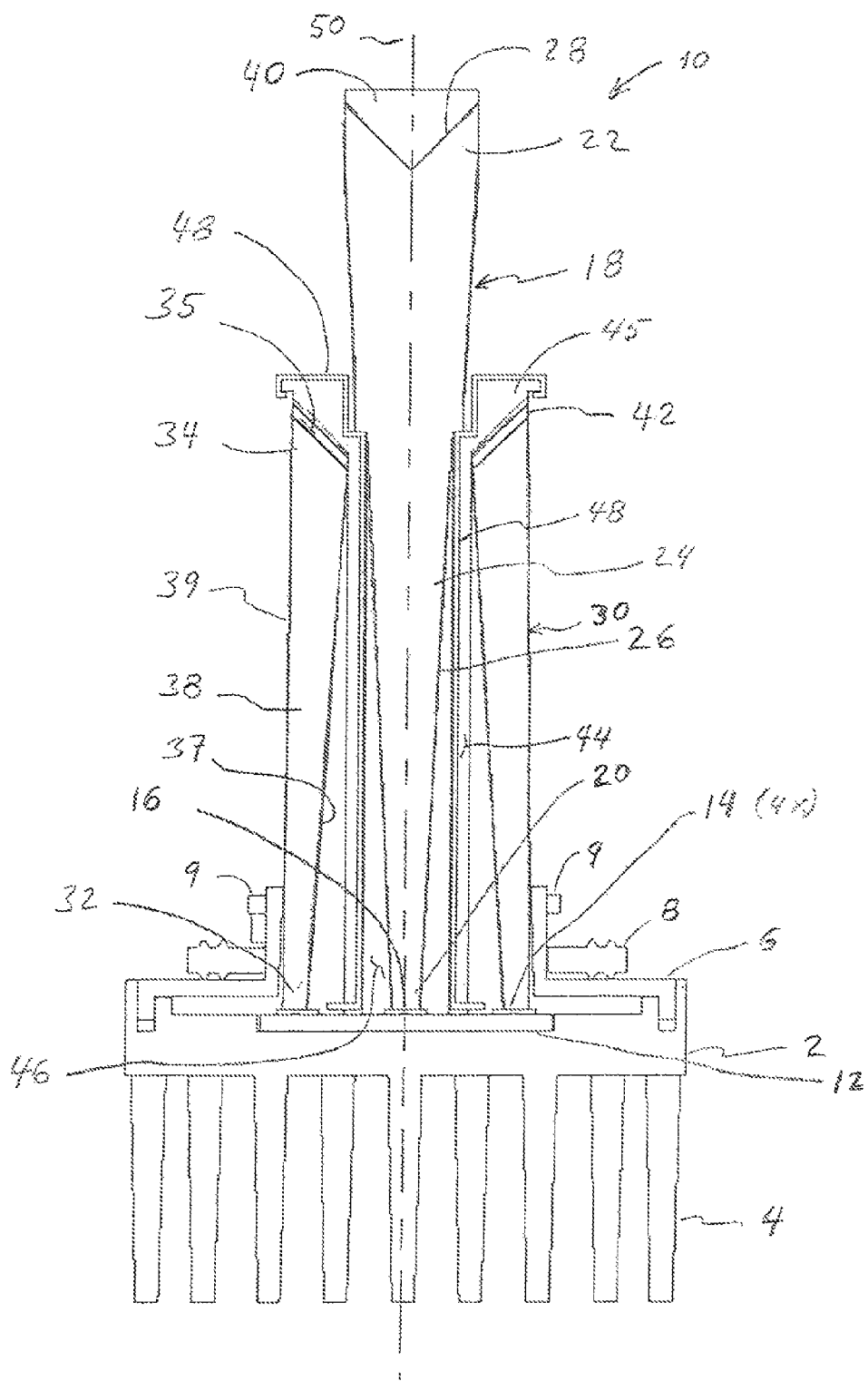
FIG. 1 illustrates a longitudinal cross-sectional view of a lamp 10.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient. Also, it should be understood that the phraseology and terminology used herein is for the purpose of description and should not be regarded as limiting.

DETAILED DESCRIPTION INCLUDING BEST MODE OF A PREFERRED EMBODIMENT

In general, the present disclosure concerns an automotive combined turn signal and tail/stop lamp 10 having co-axial transparent collimating inner and outer light guides 18, 30. Inner collimating light guide 18 receives light from a yellow LED 16, outer collimating light guide 30 receives light from red LEDs 14, the yellow and red LEDs being located in thermal communication with a common heat sink 2. Mirror optics 40, 42 reflect light from respective light output prisms 28, 35 of the inner and outer light guides outward to nested reflectors on the automobile, which reflectors are typically housed in a Rear Combination Lamp ("RCL") housing which RCL in usual industry practice is made by a set-maker or OEM car maker. The combined turn signal and tail or stop lamp 10 is a module that is detachably mated into, and removable from as a replacement part, the RCL reflectors and housing, in a manner known in the art. Electrical conductors 48 between the light guides 18, 30 can feed power from a PC board ("PCB") 12 to supply additional light sources within an RCL housing, such as white back-up light.

Some advantages of the present embodiment are that the heat sink for the yellow turn lamp avoids causing shadow problems with the red tail lamp; that electrical connection to the yellow turn LED does not intrude into the emitted red stop light to cast a shadow; and that cooling of a single heat sink on which a printed circuit board (PCB) bearing both the yellow LED 16 and red LEDs 14 is promoted.

Figure 2:
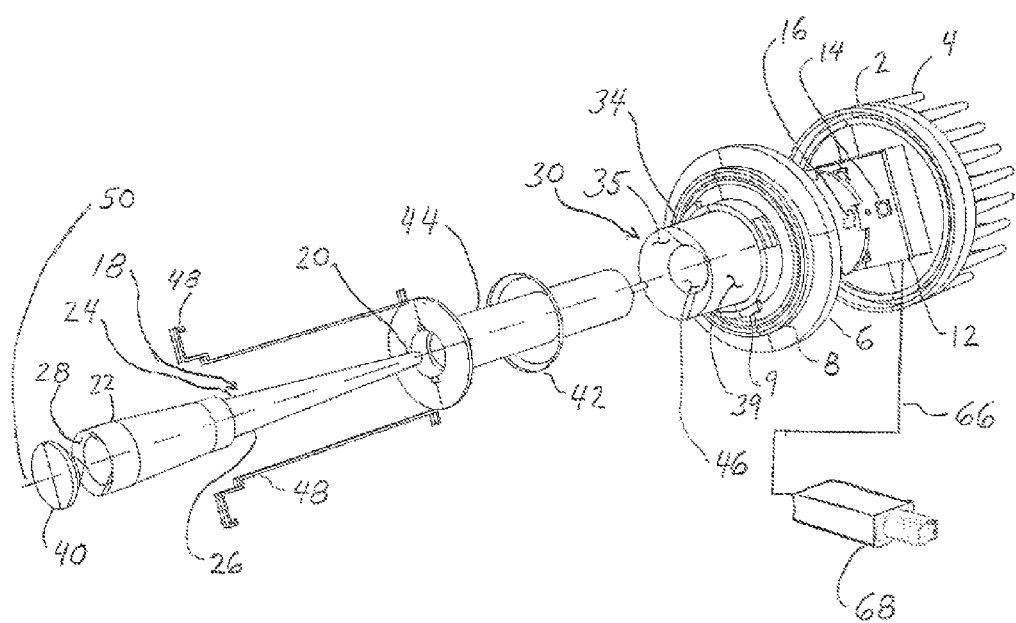
FIG. 2 illustrates an exploded perspective view of the lamp.
Figure 3:
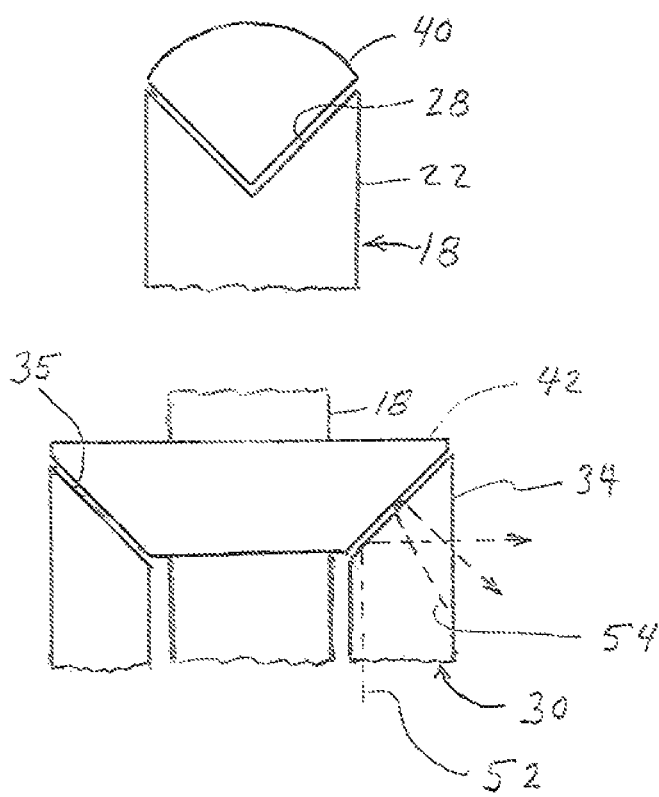
FIG. 3 illustrates a detail view of the two light output regions of the lamp.

FIGS. 1-3 show a preferred embodiment of a vehicle lamp or light module 10 with two concentric light guides, the transparent collimating inner light guide 18 and transparent collimating outer light guide 30. The light guides are molded from a plastic suitably chosen to be transparent to the desired wavelength of light and to have an index of refraction that provides for light guidance using the principles of total internal reflectance (TIR), as is known in the art, e.g. PMMA.

Figure 4:
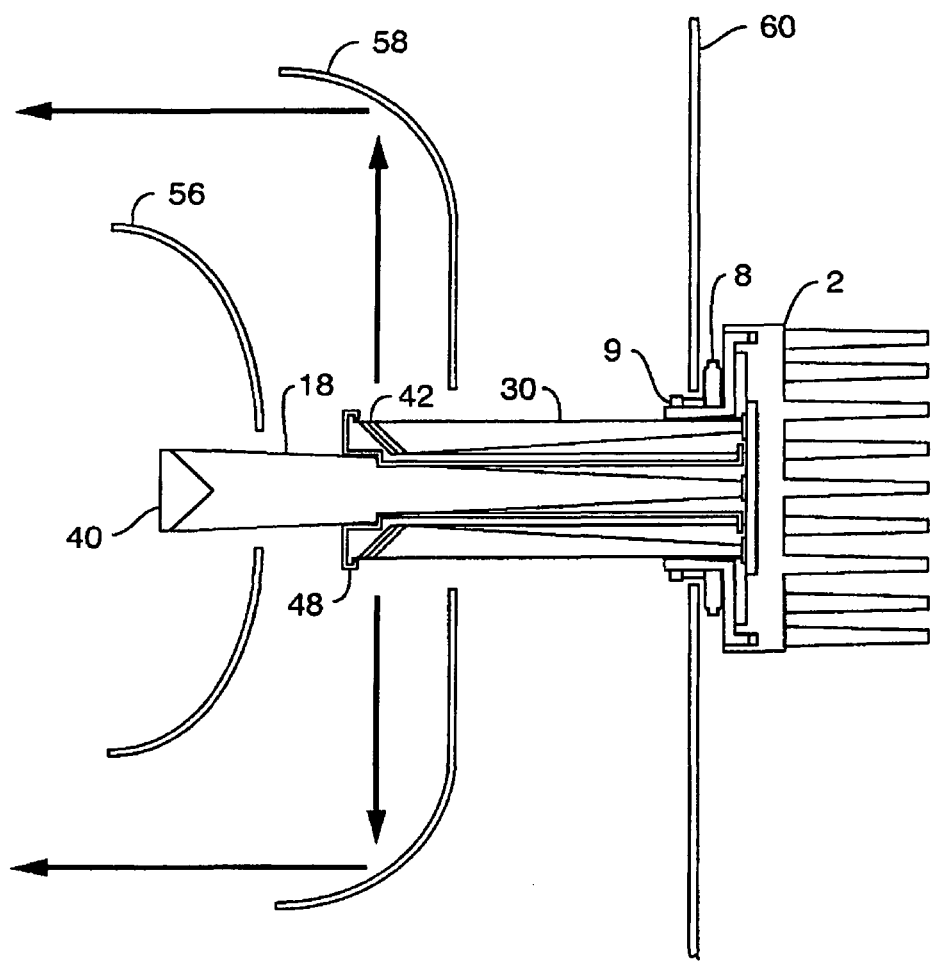
FIG. 4 illustrates a schematic view of the lamp fitted into the turn lamp and tail/stop lamp reflectors.

Printed circuit board 12 has two groups of LEDs mounted thereon. There is a central first LED 16, which is preferably yellow or amber and which is used to generate a first indicator signal. More than one first LED could be provided, but one LED 16 is sufficient. By first indicator lamp is meant a signal lamp indicating a first vehicle or automotive function such as a turn indication. A turn signal can be red or yellow according to applicable regulations in the USA, but must be yellow in Europe. For convenience LED 16 is referred to as yellow LED. Yellow LED 16 is positioned centrally of four second LEDs 14, which are preferably red. The red LEDs 14 form the light for a second indicator lamp. By second indicator lamp is meant a signal lamp indicating a second vehicle or automotive function such as tail lamp, stop lamp, or combined tail and stop lamp, depending on how the red LEDs are controlled such as by dimming a stop lamp to act as a tail lamp as well. The inner light guide 18 preferably is used to generate the first, turn indicator lamp function, while the outer light guide 30 is used to generate the second, tail or stop lamp function, but by suitable choice of light color and reflector placement in the RCL this could be reversed. Red LEDs 14 are conveniently spaced equidistant along the corners of an imaginary square footprint. Each of the yellow LED 16 and red LEDs occupies a space approximately 3.8 mm square in size, and the center-to-center spacing of a red LED 14 from yellow LED 16 is about 9.5 mm. PCB 12 is mounted in thermal communication with heat sink 2, which preferably has heat-dissipating fins 4. A cover 6 encloses PCB 12, cover 6 and heat sink 2 forming a housing supporting light guides 18, 30. Cover 6 includes locking bayonet tabs 9 for making connection of lamp module 10 to a mounting surface such as a portion of the vehicle chassis or housing of rear combination lamp (RCL) 60 (FIG. 4). Construction details of assembling a conventional housing, heat sink, and LED-bearing PCB are described in U.S. Pat. No. 8,354,781 (Tessnow) and Patent Publications US 2013/0051005 (Markell) and US2009/0034283 (Albright), each of which is hereby incorporated by reference as if fully set forth herein.

Inner collimating light guide 18 extends substantially perpendicular to circuit board 12 and defines central optical longitudinal axis 50. Inner light guide 18 has first light input region 20 near PCB 12 to receive yellow LED 16 light. Inner light guide 18 has a central portion 24 that transmits received light to first light output region 22. Inner light guide 18's light input region 20 preferably does not receive light from red LEDs 14, so as to keep the intended color of the function clear for visual perception by other motorists. Central portion 24 has a light guiding surface 26 that helps transmit light through use of principles of total internal reflection to light output 22. Inner light guide 18 is tapered and preferably a solid piece, without an internal cavity.

Outer collimating light guide 30 is concentrically located around inner light guide 18. Outer light guide 30 has an inner hollow space, void or region 46 in which inner light guide 18 is received. Optionally, spacer 44 is a hollow, tubular shape and helps support inner light guide 18 and the spacer's upper portion 45 abuts near second light output region 34 of outer light guide 30. Outer light guide 30 preferably has an outer wall or light guiding surface 39 that is straight and generally parallel to optical axis 50 and an inner wall light guiding surface 37 that is conical or parabolic, as this allows locating red LEDs 14 further away from yellow LED 16 but within the same footprint on circuit board 12. Optionally, it would be optically equivalent if the inner light guiding surface 37 of outer light guide 30 were straight and outer light guiding surface 39 be angled such as conically or shaped so as to lie along a parabolic shape. A parabolic shape would work well, but typically with molded plastics parts a conical shape is more forgiving for optical purposes in terms of production tolerances (since as is shown in longitudinal cross section of FIG. 1 the cone has "straight-line" surfaces). It is noted that a straight wall perpendicular to circuit board 12 may have a small draft angle as is common with molded plastics parts. Outer light guide 30 preferably receives light exclusively from red LEDs 14 to the exclusion of yellow light from LED 16.

It is noted that a straight cylindrical tubular light guide with parallel side walls as depicted as element 28 in U.S. Pat. No. 8,354,781 (Tessnow) does not collimate. In contrast, inner light guide 18 and outer light guide 30 herein are collimating.

Overall, collimating inner light guide 18 appears tapered, and in longitudinal cross sectional view of FIG. 1 appears as a cone. It was seen as preferable from a standpoint of overall space constraints and simplification of parts to collimate the light within the light guide 18, 30 rather than use a non-collimating light tube with an additional optic on top of the respective light guide. It will be seen that collimating outer light guide 30 has, in longitudinal cross sectional view, see FIG. 1, on each side to the left or right of central optical axis 50 a shape that appears trapezoidal. The four surfaces of the second light input region 32 (forming a kind of foot), the inner light guiding surface 37, the second reflecting surface 35 and the outer light guiding surface 39 collectively, in cross section, form a periphery of a trapezoidal shape. It is not necessary that either inner light guide 18 or outer light guide 30 have at their respective first and second light input regions 20, 32 a parabolic or spherical lens, which lens shapes at the input tend to be inefficient.

Light output region 22 of inner light guide 18 is formed as a depression, such as a conical depression. Such depressions are known to one of skill in the art as shown in U.S. Pat. No. 7,111,972 (Coushaine) at e.g. conical wall 248 in FIG. 9 therein or US Pat. Publication 2010/0208488 (Luo) at e.g. indentation 110 in FIG. 1 therein, the contents of which are incorporated by reference herein.

Light output region 34 of outer light guide 30 has a chamfered appearance in cross-section formed by second reflecting surface 35 which acts as a prism to take red light reflected, using principles of TIR, from second light input region 32 and transmitted through second central portion 38 by inner light guiding surface 37 and outer light guiding surface 39. Light output region 34 can be a conical section.

Light is reflected by both first reflecting surface 28 and second reflecting surface 35 away from optical axis 50 best for light rays 52 traveling through the light guide that satisfy the TIR condition, such as rays parallel or near axis 50. A respective first mirror 40 atop inner light guide 18 and second mirror 42 atop outer light guide 30 assists to reflect the rest of the light, such as shown schematically in FIG. 3 for light ray 54 that, not fulfilling the TIR condition, is refracted out of light guide 30 but reflected by second mirror 42 back into light guide 30 so as to be useful. It was determined that this combination of a respective mirror in combination with the prism at the light output region is better than a mirror alone used in conjunction with a conventional flat upper region of a light guide that would be having a flat surface perpendicular to its central axis (e.g. as shown in U.S. Pat. No. 8,354,781 (Tessnow) relative to central axis 18 therein). In embodiments disclosed herein, an emission pattern for the red light exiting the system with outer light guide 30 is seen as 72% total efficiency (183 lumen) with 42% efficiency within +/−12 degree angle (107 lumen) to the radial, horizontal direction perpendicular to optical axis 50, and an emission pattern for the yellow light exiting the system with inner light guide 18 is seen as 72% total efficiency (102 lumen) with 59% efficiency within +/−12 degree angle (85 lumen) to the radial, horizontal direction perpendicular to optical axis 50.

Figure 5:
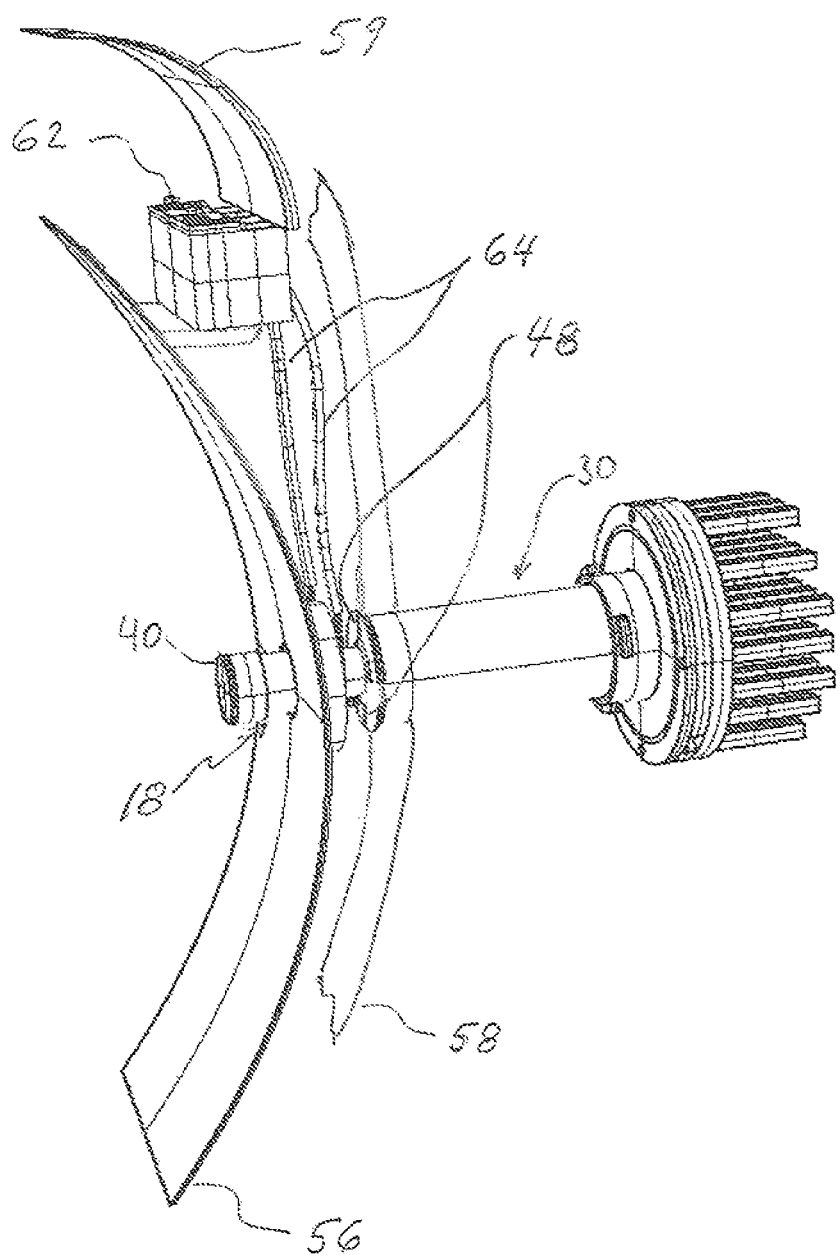
FIG. 5 illustrates a schematic perspective view of the mounted lamp providing electrical connection to a backup lamp assembly.

The exploded perspective view of FIG. 2, and FIG. 1, show spacer 44 inserted into cavity 46 within outer light guide 30. Optionally, electrical contacts 48, preferably two contacts 48, are fed between inner light guide 18 and outer light guide 30. A bottom region of electrical contacts 48 proximal to circuit board 12 contact electrical traces built onto circuit board 12. Electrical contacts 48 extend along spacer 44, and partly though spacer upper portion 45 to be supported at upper, distal regions exposed, a shown in FIG. 4, so as to be available to make electrical contact to feed power to another optionally electric device, such as a white light LED backup module, as shown in FIG. 5. Electrical contacts 48 do not block the red light because they are inside of red LED outer light guide 30. Electrical contacts 48 also do not interfere with the yellow light because electrical connection to the other electric device such as backup module 62 is picked up behind first mirror 40. As shown in FIG. 2, second mirror 42 is annular, can be a conical section, and surrounds inner light guide 18, as is also shown in FIG. 1.

Heat sink 2 can function well for yellow LED 16 and red LEDs 14 on circuit board 12 and still be minimized in size by removing driver electronics therefrom and placing them on an external driver. This also allows the heat sink to run hotter. Cable 66 provides power supply to circuit board 12 from connector plug 68, as is conventional in the art. Yellow LED 16 receives power at the same circuit board 12 to which red LEDs 14 are mounted, avoiding that a power supply wire to the yellow LED blocks red light to the stop or tail lamp. Thus, electrical power can be fed to both the yellow turn indicator, and optionally to white backup LEDs, without interfering with the red light emission and provide effective cooling to both the yellow LED and red LEDs.

Heat sink 2 and housing 6 latch onto vehicle chassis or rear of housing of rear combination lamp 60 conventionally through bayonet tabs 9 as shown in FIG. 4, and so can be located where heat sink 2 can cool effectively.

FIG. 4 shows lamp module 10 latched to RCL housing 60 and brought into optical alignment with turn indicator first reflector 56 which receives yellow light from inner light guide 18 and in optical alignment with tail or stop lamp second reflector 58 which receives red light from outer light guide 30.

FIG. 5 shows in schematic fashion backup LED module 62, which has white light LEDs mounted to a circuit board positioned in thermal communication with a heat sink. Backup LED module 62 can be mounted conveniently within the RCL housing, such as attached to a rear side of turn indicator first reflector 56. Electrical contacts 48 provide a power take-off contact region for electric wires 64 that feed backup light module 62, and since electrical contacts 48 (as well as backup module supply wires 64) are in the shadow behind turn indicator first reflector 56, they do not occlude red light from the tail or stop reflector 58, as also shown by comparison to FIG. 4.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, are understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

An abstract is submitted herewith. It is pointed out that this abstract is being provided to comply with the rule requiring an abstract that will allow examiners and other searchers to quickly ascertain the general subject matter of the technical disclosure. It is submitted with the understanding that it will not be used to interpret or limit the scope or meaning of the claims, as set forth in the rules of the U.S. Patent and Trademark Office.

The following is a non-limiting list of reference numerals used in the specification:

2 heat sink
4 heat sink fins
6 housing cover
8 seal gasket
9 bayonet tabs
10 light module
12 printed circuit board
14 red LEDs
16 yellow LED
18 transparent collimating inner light guide
20 first light input region
22 first light output region
24 first central portion
26 light guiding surface of first light guide
28 first reflecting surface
30 transparent collimating outer light guide
32 second light input region
34 second light output region
35 second reflecting surface
37 inner light guiding surface
38 second central portion
39 outer light guiding surface
40 first mirror
42 second mirror
44 spacer
45 upper portion of spacer
46 cavity
48 electrical contacts
50 central optical longitudinal axis
52 light ray reflected through TIR
54 steep angle light ray not fulfilling TIR but reflected
56 turn indicator first reflector
58 tail or stop second reflector
59 backup light reflector
60 housing of RCL assembly
62 backup light white LED assembly
64 electric wires to backup light
66 power supply to PCB 12
68 power plug

What is claimed is:

1. A vehicle light module (10) LED combination lamp having a first indicator lamp and a second indicator lamp, comprising:
   a heat sink (2) and a printed circuit board (12) in thermal communication with said heat sink (2), said printed circuit board having disposed thereon a plurality of LEDs, said plurality of LEDs comprising a first LED (16) emitting a first color adapted to form said first indicator lamp and a plurality of second LEDs (14) in surrounding relation to said first LED (16), said plurality of second LEDs (14) emitting a second color different from said first color wherein said second color is adapted to form said second indicator lamp;
   a transparent collimating inner light guide (18) in optical communication with said first LED (16), said first inner guide defining a central optical longitudinal lamp axis (50) extending away from said printed circuit board;
   a transparent collimating outer light guide (30) in optical communication with said plurality of second LEDs (14), said outer light guide (30) defining an internal cavity (46) such that said outer light guide (30) is, in a radial direction, disposed around said inner light guide (18);
   said inner light guide (18) having
      a first light input region (20) proximal said printed circuit board (12),
      a first light output region (22) distal from said printed circuit board (12), and
      a first central portion (24) configured to pass light received from said first light input region (20) toward said first light output region (22),
      said first light output region (22) defining a first reflecting surface (28) positioned to reflect light incident thereon away from the lamp axis (50);
   a first mirror (40) mounted proximate said inner light guide (18) in optical communication with light from said first LED (16) exiting said first light output region (22);
   said outer light guide (30) having
      a second light input region (32) proximal said printed circuit board (12),
      a second light output region (34) distal from said printed circuit board (12), and
      a second central portion (38) configured to pass light received from said second light input region (32) toward said second light output region (34),
      said second light output region (34) defining a second reflecting surface (35) positioned to reflect light incident thereon away from the lamp axis (50); and
   a second mirror (42) mounted adjacent the second light output region in optical communication with light from said plurality of second LEDs (14) exiting said second light output region (34).

2. The vehicle light module (10) of claim 1, wherein the first color is yellow.

3. The vehicle light module (10) of claim 2, wherein the second color is red.

4. The vehicle light module (10) of claim 1, wherein the second color is red.

5. The vehicle light module (10) of claim 1, wherein the inner light guide (18) and the outer light guide (30) are, as seen in longitudinal cross-section, tapered.

6. The vehicle light module (10) of claim 1, wherein the inner light guide (18) and outer light guide (30) each have at least one light guiding surface (26; 37, 39) having a shape selected from the group of shapes consisting of conical or parabolic.

7. The vehicle light module (10) of claim 1, wherein the inner light guide (18) is tapered and the outer light guide (30) has an internal surface (37) that is parabolic.

8. The vehicle light module (10) of claim 1, wherein the outer light guide (30) has a tapered inner light guiding surface (37) and an outer light guiding surface (39) that is straight and generally parallel the optical axis (50).

9. The vehicle light module (10) of claim 1, wherein the outer light guide (30) is tapered along both inner and outer light guiding surfaces (37, 39).

10. The vehicle light module (10) of claim 1, further comprising a spacer (44) disposed between said inner light guide (18) and outer second light guide (30).

11. The vehicle light module (10) of claim 1, wherein the second mirror (42) surrounds the inner light guide (18).

12. The vehicle light module (10) of claim 1, wherein the first reflecting surface (28) is formed as a conical depression, and the second reflecting surface (35) is formed as an annular conical section.

13. The vehicle light module (10) of claim 1, wherein the internal cavity (46) is defined between an outer light guiding surface (26) of the inner light guide (18) and an inner light guiding surface (37) of the second light guide (30), and further comprising electrical contacts (48) disposed partly within cavity (46), said electrical contacts (48) extending to the printed circuit board (12) and being in electrical communication with electrical traces on the printed circuit board (12), said electrical contacts (48) being adapted to supply electrical power to a third electrical device.

14. The vehicle light module (10) of claim 13, wherein said electrical contacts (48) extend exterior of said outer light guide (30).

15. The vehicle light module (10) of claim 10, wherein the internal cavity (46) is disposed within an internal region of the spacer (44), and electrical contacts (48) are disposed partly within said internal cavity (46) inside said spacer (44) and are exposed exterior of the spacer (44), said electrical contacts (48) extending to the printed circuit board (12) and being in electrical communication with electrical traces on the printed circuit board (12), said electrical contacts (48) being adapted to supply electrical power to a third electrical device.

16. The vehicle light module (10) of claim 1, wherein the first indicator lamp is a turn signal and said second indicator lamp is a tail or stop lamp.

17. The vehicle light module (10) of claim 1, wherein
   said first light input region (20) is configured to receive input light from said first LED (16) exclusive of light emitted by said plurality of second LEDs (14), and
   said second light input region (32) is configured to receive input light from said second plurality of LEDs (14) exclusive of light emitted by said first LED (16).

18. A rear combination lamp (RCL) comprising the vehicle light module (10) of claim 1 in combination with a first turn indicator reflector (56) and a second tail or stop reflector (58), whereby the first turn indicator signal reflector (56) is coaxial with and nested within said second tail or stop reflector (58), said turn indicator reflector (56) receiving light from said inner light guide (18) and said tail or stop reflector (58) receiving light from said outer light guide (30).

* * * * *